May 13, 1930.  H. C. JACOBSON  1,758,702
GRINDING MACHINE WITH SCREEN
Filed July 22, 1927
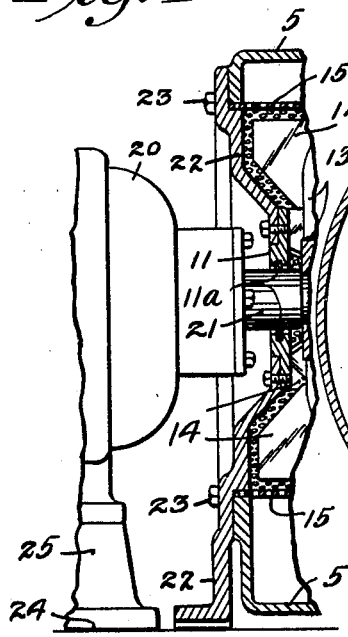
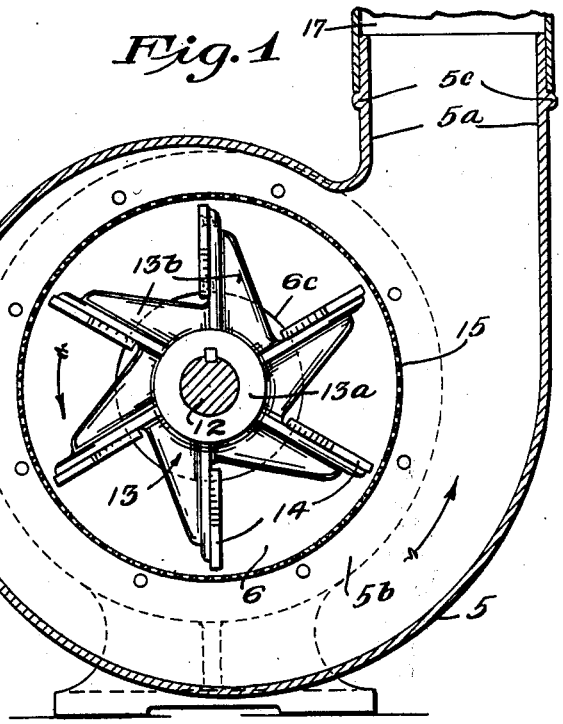
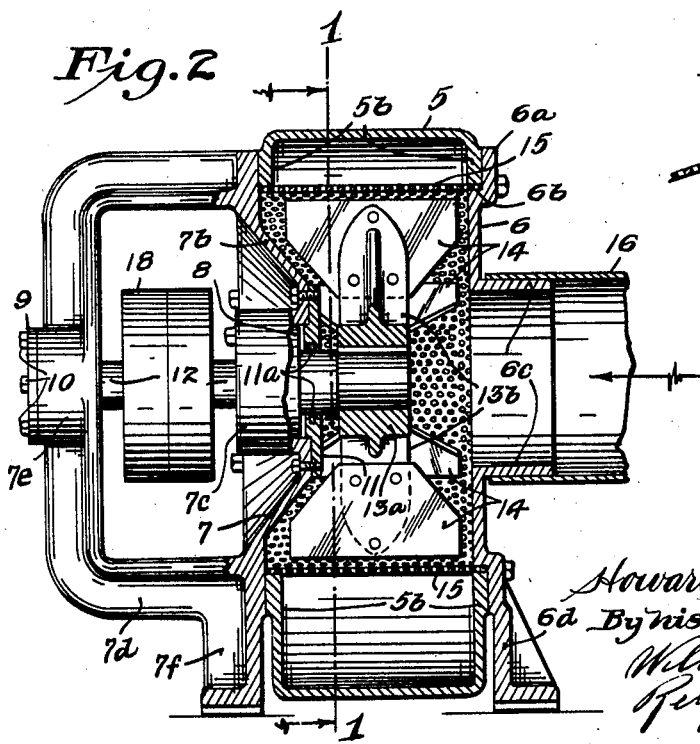
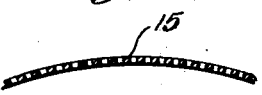
Inventor
Howard C. Jacobson
By his Attorneys Patented May 13, 1930

1,758,702

UNITED STATES PATENT OFFICE

HOWARD C. JACOBSON, OF MINNEAPOLIS, MINNESOTA

GRINDING MACHINE WITH SCREEN

Application filed July 22, 1927. Serial No. 207,664.

This invention relates to a grinding machine and while the device is capable of grinding many different materials, it particularly is designed for grinding comparatively light materials, such as screenings, certain animal feeds comprising small seeds and other fine materials including dried milk.

It is an object of this invention to provide an extremely simple and efficient grinding mill for fine materials comprising a fan having blades and a spiral casing eccentrically disposed in relation to said blades, together with a cylindrical sheet metal member having a multiplicity of holes therethrough surrounding said blades and disposed comparatively close thereto and concentric therewith.

It is another object of the invention to provide a simple form of grinding mill comprising a helical casing having a discharge outlet, a fan comprising a central hub and outwardly extending blades disposed in the plane of said casing and outlet, a cylindrical member having a multiplicity of holes therein disposed in said casing and engaging flanges thereof, together with a side plate closing one side of said casing and having an opening for a shaft carrying said fan and another side plate for closing the opposite side of said casing having a central opening adapted to support a feeding conduit co-axially with said fan, said side plates engaging the ends of said cylindrical member.

These and other objects and advantages of the invention will be fully set forth in the following description wherein like reference characters refer to like parts throughout the different views, and in which Fig. 1 is a section taken on the line 1—1 of Fig. 2, as indicated by the arrows;

Fig. 2 is a vertical section taken on the line 2—2 of Fig. 1, as indicated by the arrows;

Fig. 3 is a partial transverse section through the cylindrical screen used; and

Fig. 4 is a view similar to Fig. 2 showing a modification.

Referring to the drawings, a grinding machine is shown comprising a spiral or helical casing 5. This casing has at one side a discharge outlet $5^a$ and has openings at either side defined by the inwardly extending flanges $5^b$. The casing has a plate 6 secured to one side thereof having a circular flange $6^a$ extending over the outer side of one of the flanges $5^b$ and having an inwardly extending portion forming a shoulder $6^b$ alined with the inner edge of the flange $5^b$. The plate 6 also has a central opening surrounded by a flange $6^c$ and is provided with a foot or base portion $6^d$. Another plate or bracket 7 is provided adapted to close the other side of casing 5, having flat circular surfaces $7^a$ at one side fitting against the outer side of one of the flanges $5^b$. The member 7 has an inwardly extending frusto-conical portion $7^b$ extending somewhat into the casing 5, which portion has an outwardly extending cylindrical flange $7^c$ adapted to hold a bearing member 8. The member 7 also has a U-shaped bracket portion $7^d$ shown as disposed in a vertical plane having a hub $7^e$ at its outer end also adapted to hold a bearing, which bearing is held in place by the flange 9 connected to the bracket $7^d$ by the screws 10. The member 7 also has a base or foot portion $7^f$ in its lower side shaped similar to and alined with the foot portion $6^d$. The inner end of portion $7^b$ is closed by a plate 11 bolted thereto, which plate has a central aperture with the groove $11^a$ extending thereabout adapted to receive a packing material for engaging the shaft 12 which is supported in bearings 8 and 9 and which carries at one end within the casing 5 a fan member 13. Said fan member has a hub $13^a$ keyed to the shaft 12 from which hub radiate the arms $13^b$ to which are bolted the fan blades or plates 14. A cylindrical sheet metal member 15 having a multiplicity of holes therethrough which are perfectly round, is provided. This member thus constitutes a screen and, as clearly shown in Fig. 2, this member engages the inner edges of flanges $5^b$ and is disposed between the same and the shoulder $6^b$ at one side of the casing 5, the end of said member 15 engaging the surface $7^a$ of member 7. The inlet or feed conduit 16 is provided supported on the cylindrical flange $6^c$. An outlet or discharge conduit 17 is also provided fitting over the end of the outlet spout $5^a$ of casing 5 and resting against a bead $5^c$ thereon. The shaft 12 is driven by a pulley 18 secured thereto and disposed within the bracket 7ᵈ.

In operation, the pulley 18 and fan 13 will be driven by a suitable belt running over pulley 18 and the driving pulley. The fan 13 is rotated at high speed and creates powerful suction through the inlet conduit 16, the air being discharged through the outlet conduit 17. The material to be ground will be fed into the conduit 16 and will be drawn into the fan within the cylindrical member 15. The material will be thrown out against the screen member 15 and will be comminuted so as to pass through the openings of member 15 and the material will then pass into casing 5 at the outer side of the screen 15 and will be discharged through spout 5ᵃ and conduit 17. It will be noted that the casing 5 is spiral in shape and it is disposed eccentrically to the member 15. There will be the least air to be moved at the point where the wall of casing 5 is closest to screen 15 and there will be successively more air and material to be moved as the wall diverges from the screen 15. The wall of casing 5 is thus effectively disposed relatively to said member 15. By having the member 15 concentric to the blades 14 of the fan, the same grinding effect is produced at all points around the member 15. The member 15, in practice, has been formed of a plate of sheet material bent into cylindrical form and welded together at its edges. In practice, the members 15 are used with different sized holes for different materials. The members are easily removed to be interchanged by merely removing the plate 6. The screen members 15 can then be withdrawn longitudinally and another screen member slid into place. It will be seen that the casing 5 can be rotated relatively to the plates 6 and 7 when the connecting bolts are removed so that the discharge spout 5ᵃ can be disposed in any desired direction.

In Fig. 4 a modified construction is shown in which a motor 20 is used having the projecting armature shaft 21 on which the end of which fan 13 is mounted, the end of the shaft being of the same structure as the end of shaft 12. The shaft 21 extends through the plate 22 which is similar in all respects to plate 7 except that it does not have the U-shaped bracket portion 7ᵈ. The plate 11 may be provided having the packing 11ᵃ in the groove therein engaging the shaft 21. The plate 22 is secured to the casing 5 by the bolts 23. The plate 22 and the opposite plate 6ᵈ which will be used will be connected to a base 24 which will preferably be a cast plate and the pad or bracket 25 will also be bolted to the base 24, motor 20 being bolted to the top of pad 25. The other parts of the device shown in Fig. 4 will be exactly the same as those shown in Figs. 1 and 2.

In operation the motor 20 will be run as usual by a provision of proper current and the fan 13 will be driven directly from the motor. An extremely simple hook up is thus used and a very simple and efficient grinding device is provided.

From the above description it is seen that applicant has provided an extremely simple grinding machine and one which will have great utility in grinding such materials as mentioned. The machine has been amply demonstrated in actual practice and found to be very efficient for grinding fine materials and the same is now being commercially made. The inventor is aware that cylindrical members have heretofore been used with heaters but it is thought the combination of the spiral fan casing with the cylindrical screen member extending throughout 360 degrees with the fan concentric therewith, eccentric to the fan casing is novel.

It will, of course, be understood that various changes may be made in the form, details, arrangement, and proportions of the parts without departing from the scope of applicant's invention, which, generally stated, consists in a device capable of carrying out the objects above set forth, in the novel parts and combinations of parts disclosed and defined in the appended claims.

What is claimed is:

1. A grinding machine having in combination, a rotary material suction and discharge fan comprising a unit with material disintegrating blades, a circular member having a plurality of holes therethrough surrounding said fan, said holes being spaced sufficiently close to each other to retain material operated upon by said blades until reduced thereby, said circular member being disposed in proximity to the outer edges of said blades and concentric of said fan, an imperforate casing surrounding said circular member and fan and disposed in eccentric relation thereto, the said casing having an inlet at one side thereof co-axial with said fan and having a tangential outlet leading therefrom, there being a free space between said circular member and the peripheral wall of said casing which increases in radial dimension in the direction of rotation of said fan toward said outlet, a shaft on which said fan is mounted and means for rotating said shaft at high speed.

2. A grinding machine having in combination, a rotary material suction and discharge fan comprising a unit with material disintegrating blades, a cylindrical member having a plurality of holes therethrough, surrounding said fan, said holes being spaced sufficiently close to each other to retain material operated upon by said blades until reduced thereby, said cylindrical member being disposed in proximity to the outer edges of said blades of said fan, an imperforate casing surrounding said cylindrical member and fan and disposed in eccentric relation thereto, the said casing having an inlet at one side thereof co-axial with said fan and having a tangential outlet leading therefrom, there being a free space between said cylindrical member and the peripheral wall of said casing which increases in radial dimension in the direction of rotation of said fan toward said outlet, a member closing the side of said casing opposite said inlet and having an opening therein, a shaft extending through said opening on which said fan is mounted, and means for rotating said shaft at high speed.

3. A grinding machine having in combination, a rotary material suction and discharge fan comprising a unit with material disintegrating blades, a cylindrical member having a plurality of holes therethrough, surrounding said fan, said holes being spaced sufficiently close to each other to retain material operated upon by said blades until reduced thereby, said cylindrical member being disposed in proximity to the outer edges of said blades and concentric of said fan, an imperforate casing surrounding said cylindrical member and fan and disposed in eccentric relation thereto, said casing having a tangential outlet leading therefrom, there being free space between said cylindrical member and the peripheral wall of said casing which increases in radial dimension in the direction of rotation of said fan toward said outlet, a plate closing one side of said casing having an inlet opening therethrough co-axial with said fan, said plate engaging one edge of said cylindrical member, a plate closing the other side of said casing having an aperture extending therethrough co-axial with said fan and engaging the other edge of said cylindrical member, a shaft extending through said aperture in said latter plate and closely fitting therein, on which said fan is mounted, and means for rotating said shaft at high speed.

4. A grinding machine having in combination, a rotary material suction and discharge fan comprising a unit with material disintegrating blades, a cylindrical member having a plurality of holes therethrough, surrounding said fan, said holes being spaced sufficiently close to each other to retain material operated upon by said blades until reduced thereby, said cylindrical member being disposed in proximity to the outer edges of said blades and concentric of said fan, an imperforate casing surrounding said cylindrical member and fan and disposed in eccentric relation thereto, the said casing having an inlet at one side thereof co-axial with said fan and having a tangential outlet leading therefrom, there being a free space between said cylindrical member and the peripheral wall of said casing which increases in radial dimension in the direction of rotation of said fan toward said outlet, a plate closing the side of said casing opposite said inlet, having an aperture therethrough co-axial with said fan and having bearings thereon spaced longitudinally of the axis of said fan, a shaft journaled in said bearings and extending through said casing on which said fan is mounted and means on said shaft for rotating the fan at high speed.

5. A grinding machine having in combination, a rotary material suction and discharge fan comprising a unit with material disintegrating blades, a cylindrical member having a plurality of holes therethrough, surrounding said fan, said holes being spaced sufficiently close to each other to retain material operated upon by said blades until reduced thereby, said cylindrical member being disposed in proximity to the outer edges of said blades and concentric of said fan, an imperforate casing surrounding said cylindrical member and fan and disposed in eccentric relation thereto, the said casing having an inlet at one side thereof co-axial with said fan and having a tangential outlet leading therefrom, there being a free space between said cylindrical member and the peripheral wall of said casing which increases in radial dimension in the direction of rotation of said fan toward said outlet, a plate closing one side of said casing having an aperture therethrough co-axial with said fan, said plate having a frusto-conical portion extending into said casing and having a U shaped bracket thereon, bearings carried by said bracket and frusto-conical portion respectively, a shaft journaled in said bearings and extending through said aperture on which said fan is mounted and a pulley carried on said shaft between said bearings for rotating said shaft.

6. A grinding machine having in combination, a rotary material suction and discharge fan comprising a unit, a cylindrical member having a plurality of holes therethrough surrounding said fan, said holes being spaced sufficiently close to each other to retain material operated upon by said blades until reduced thereby, said cylindrical member being disposed in proximity to the outer edges of said blades and concentric of said fan, an imperforate casing surrounding said cylindrical member and fan and disposed in eccentric relation thereto, said casing having an inlet at one side thereof co-axial with said fan, said fan having material disintegrating blades beveled from a point on their lateral edges beyond the walls of said inlet inwardly toward the axis of said fan, said casing also having a tangential outlet leading therefrom, there being a free space between said cylindrical member and the peripheral wall of said casing which increases in radial dimension in the direction of rotation of said fan toward said outlet, a member closing the side of said casing opposite said inlet and having a conical portion extending thereinto having a surface substantially parallel to the beveled edges of said blades, a shaft extending through said last mentioned member on which said fan is mounted and means for rotating said shaft at high speed.

7. A grinding machine having in combination, a rotary material suction and discharge fan comprising a unit with material disintegrating rigid blades, a cylindrical member having a plurality of holes therethrough, surrounding said fan, said holes being spaced sufficiently close to each other to retain material operated upon by said blades until reduced thereby, said cylindrical member being disposed in proximity to the outer edges of said blades and concentric of said fan, an imperforate casing surrounding said cylindrical member and fan and disposed in eccentric relation thereto, said casing having a tangential outlet leading therefrom, there being a free space between said cylindrical member and the peripheral wall of said casing which increases in radial dimension in the direction of rotation of said fan toward said outlet, a member closing one side of said casing having an inlet opening therein co-axial with said fan, the sides of said blades being beveled inwardly forming an open conical space adjacent said inlet, a member closing the other side of said casing having an opening therethrough co-axial with said fan, a shaft extending through said last mentioned opening upon which said fan is mounted and means for rotating said shaft at high speed.

In testimony whereof I affix my signature.

HOWARD C. JACOBSON.